United States Patent
Gainford

(10) Patent No.: US 7,347,050 B2
(45) Date of Patent: Mar. 25, 2008

(54) FUEL METERING UNIT

(75) Inventor: David M Gainford, Sutton Coldfield (GB)

(73) Assignee: Rolls-Royce plc, London (GB)

( * ) Notice: Subject to any disclaimer, the term of this patent is extended or adjusted under 35 U.S.C. 154(b) by 258 days.

(21) Appl. No.: 11/088,971

(22) Filed: Mar. 24, 2005

(65) Prior Publication Data

US 2005/0268972 A1    Dec. 8, 2005

(30) Foreign Application Priority Data

Apr. 22, 2004    (GB)    ................................ 0408886.0

(51) Int. Cl.
  *F02C 9/26* (2006.01)
  *F02C 9/46* (2006.01)
(52) U.S. Cl. ..................... 60/734; 123/198 D; 137/2; 137/110; 137/545; 137/554
(58) Field of Classification Search ................. 60/734, 60/39.281; 123/198 D; 137/110, 545, 554, 137/2
See application file for complete search history.

(56) References Cited

U.S. PATENT DOCUMENTS

| | | | |
|---|---|---|---|
| 3,131,751 A * | 5/1964 | Twibell | ........................ 137/545 |
| 3,790,931 A * | 2/1974 | Leveraus | ..................... 340/451 |
| 4,326,376 A | 4/1982 | Stearns et al. | |
| 4,549,563 A * | 10/1985 | Monnier | ..................... 137/100 |
| 4,656,827 A * | 4/1987 | Puillet | ..................... 60/39.281 |
| 4,827,714 A * | 5/1989 | Miles | .......................... 60/764 |
| 4,932,205 A * | 6/1990 | Alderfer et al. | ......... 63/39.091 |
| 5,284,020 A | 2/1994 | Brocard et al. | |
| 6,357,219 B1 * | 3/2002 | Dudd et al. | ................... 60/790 |
| 6,401,446 B1 * | 6/2002 | Gibbons | .................. 60/39.281 |

FOREIGN PATENT DOCUMENTS

EP    01 286 299 A3    10/1988

* cited by examiner

*Primary Examiner*—Stephen M. Hepperle
(74) *Attorney, Agent, or Firm*—Oliff & Berridge, PLC

(57) ABSTRACT

A fuel metering unit 10 for an aircraft. The unit 10 having an inlet leg 12 within which fuel flows, which leg 12 splits into controlling legs 18, 20 which rejoin downstream to form an outlet leg 30. Shut off valves 28, 30 are provided respectively in the controlling leg 18 and outlet leg 30. Fuel flow through the legs 18, 20 is compared, and if an unexpected relative comparison is made, fuel flow through one or both of the legs 18, 20 can be stopped using respectively either of the valves 28, 32.

2 Claims, 6 Drawing Sheets

FUEL METERING UNIT

This invention concerns fuel metering units, and particularly but not exclusively such units for aircraft; a method of controlling a vehicle, and especially an aircraft.

Most engine control systems incorporate a fuel metering unit which, under internal or external failure conditions, can inadvertently supply significant fuel flow to the engine. With aircraft, the resultant thrust excursion can be hazardous, and in some cases a straightforward overspeed detection device may not always protect the engine from over temperature conditions. This can for instance be a particular problem with twin engine airplanes where each engine must be able to provide sufficient thrust on its own for take off, and therefore the maximum thrust of each engine is relatively high.

According to the present invention there is provided a fuel metering unit, the unit including passages along which fuel flows through the unit, the passages including an inlet leg, the inlet leg dividing into two controlling legs, the controlling legs rejoining downstream to form an outlet leg, with a shut off valve in at least one of the controlling or outlet legs.

A shut off valve is preferably provided in at least one of the controlling legs.

The controlling legs may be arranged so as to have in normal usage a substantially equal fuel flow therethrough. Alternatively, the controlling legs may be arranged such that a predetermined greater proportion of fuel flows through one of the legs relative to the other.

Control valves for controlling the amount of fuel flowing may be provided in one or both of the controlling legs.

The control valves may be arranged such that when excess fuel is received in the controlling leg or legs, the excess fuel is returned for re-use.

A control valve of greater accuracy may be provided in one of the controlling legs, particularly for use at light-up flows.

A shut off valve may be provided in the other one of the controlling legs. Alternatively or in addition, a shut off valve may be provided in the outlet leg.

A first filter may be provided in the inlet leg. A finer filter may be provided in one or each of the controlling legs. The finer filter or filters are preferably located upstream of the respective control valve or valves.

The unit may include means for controlling the flow in each of the controlling legs, and the control valves may vary the fuel flow.

The unit may include means for actuating a respective shut off valve or valves upon detection of an unexpected relative flow between the controlling legs. The unit may provide signals which can be used to produce a maintenance signal and/or provide an alarm warning upon detecting an unexpected relative flow in the controlling legs.

The control valves may be controlled by an engine controller unit. A safety unit independent of the engine controller unit may monitor the relative flow in the controlling legs.

The safety unit may control the control valves and/or shut off valves.

At least one of the shut off valves may be provided in a single unit with a respective control valve, but with each valve in a unit having independent actuation means.

The invention further provides a fuel metering unit for an aircraft, the unit being according to any of the preceding thirteen paragraphs.

The invention yet further provides a method of controlling a vehicle, the method comprising dividing the fuel flowing to an engine in the vehicle into two controlling legs, and measuring the relative amount in each leg, and acting upon detection of an unexpected comparison between the flows in the two legs.

The fuel measurements for each leg are preferably compared, and if an unexpected comparison is made, one or more of the following may take place: a maintenance signal is logged to identify the requirements of subsequent inspection/maintenance; an alarm signal is provided to a person controlling the vehicle; one or more shut off valves in the fuel supply is automatically actuated.

Dependent on the nature of the unexpected comparison made, a shut off valve or valves may be actuated to shut off fuel flow through one or both of the controlling legs.

The invention still further provides a method of controlling an aircraft, the method being according to any of the preceding three paragraphs.

Embodiments of the present invention will now be described by way of example only, and with reference to the accompanying drawings, in which.

Figure 1:
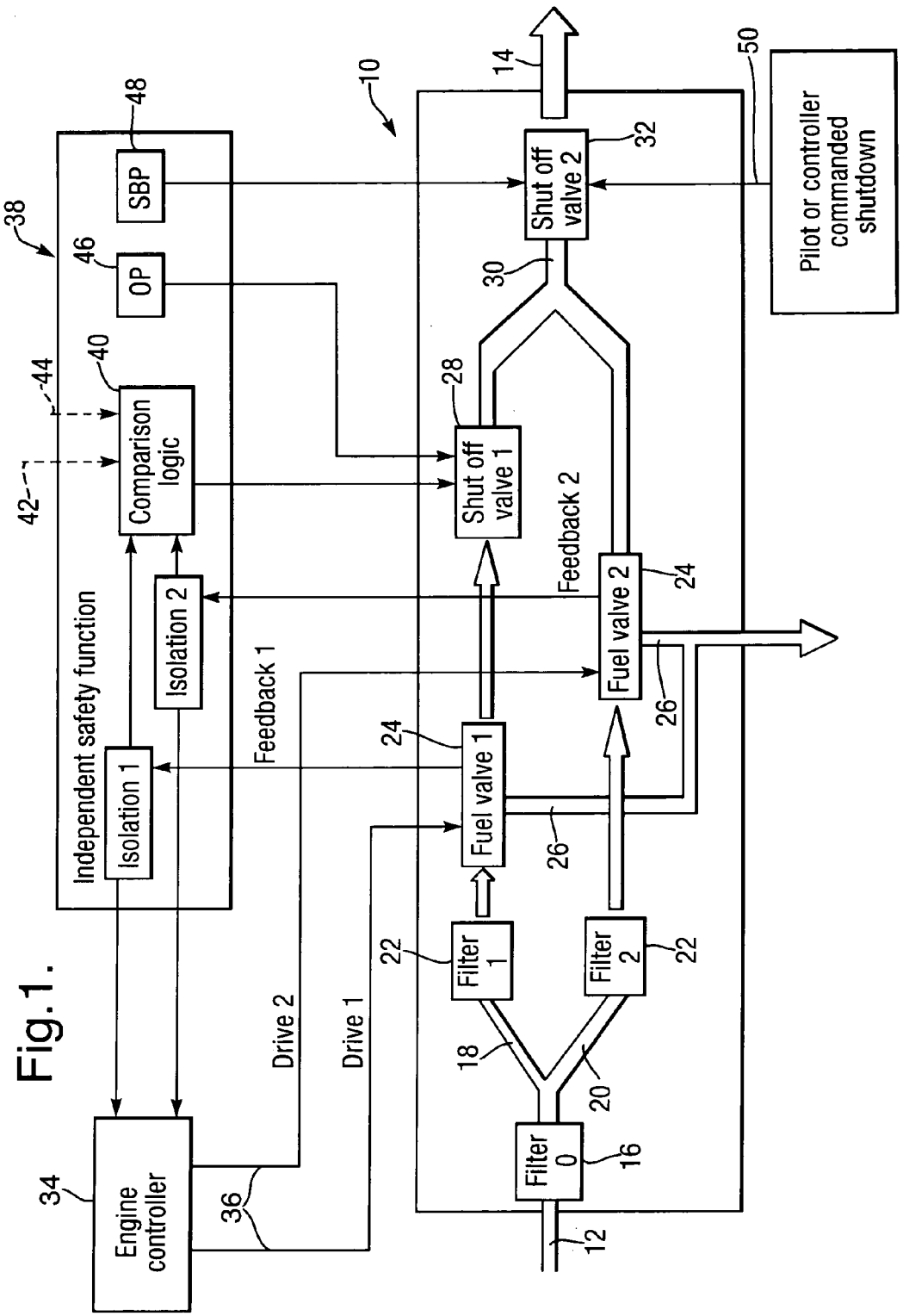
FIG. 1 is a block diagram of a first fuel metering unit according to the invention.

FIG.1 shows a fuel metering unit 10 with an inlet leg 12 and an outlet 14. A coarse filter 16 is provided at the upstream end of the inlet leg 12. Downstream of the filter 16 the leg 12 divides into first and second controlling legs 18, 20. A fine filter 22 is provided in each of the legs 18, 20. Downstream of each of the filters 22 is a respective fuel control valve 24. Both of the valves 24 have a fuel spill 26 which directs excess fuel which does not pass through the valves 24 to be returned for re-use.

Downstream of the control valve 24 in the first leg 18 is a shut off valve 28. Downstream of the valve 28 the first leg 18 rejoins the second leg 20 to form an outlet leg 30. A further shut off valve 32 is provided in the outlet leg 30.

The control valves 24 are controlled by the engine controller 34 through drives 36. An independent safety function 38 is provided which is quite independent of the engine controller 34 and has a significantly simpler arrangement. The function 38 receives a signal from the valves 24 indicating the fuel flow through each thereof. This is compared in the function 38 and an appropriate signal is sent to the controller 34 to cause an appropriate signal to be sent via the drives 36 to the valves 24.

The comparison logic 40 carried out in the function 38 also connects to the shut off valve 28 for operation thereof if required. The throttle position also connects at 42 to the comparison logic 40 as does the "aircraft discrete" 44. The overspeed protection 46 also connects to the first shut off valve 28. The shaft break protection 48 connects directly to the second shut off valve 32 to enable a complete shut down to take place in the case of a break in the main engine shaft, which shut down would generally need to take place very rapidly. A connection 50 is also provided to the second shut off valve 32 to permit a manual shut down by the pilot or a shut down by the controller 34 in other circumstances.

In use the fuel flow through the legs 18, 20 will be measured by the valves 24 and compared by the logic 40. The fuel flow measure will also be transmitted via suitable isolation means to the controller 34 to operate the fuel valves 24 appropriately. If an unexpected comparison is detected by the logic 40 then the following action can be carried out. If a failure is detected in the first leg 18, then the shut off valve 28 can be closed allowing the fuel to still be controlled through the leg 20 up to a restricted maximum. If a failure is detected in the second leg 20 then again the shut off valve 28 can be closed to restrict the maximum uncontrolled fuel flow, which will only take place through the second leg 20. The controller or pilot can shut the engine down using the second shut off valve 32 if appropriate.

If an unexpected comparison is made but of a less serious nature, this can produce a maintenance message. For slowly developing or partial faults this means that information can be used to trigger maintenance activity before an inservice event takes place. This type of function may be carried out by the engine controller 34.

It may be possible for the fuel valve 24 and shut off valve 28 to be provided in a single device, as long as sufficient independence of functionality can be established.

Figure 2:
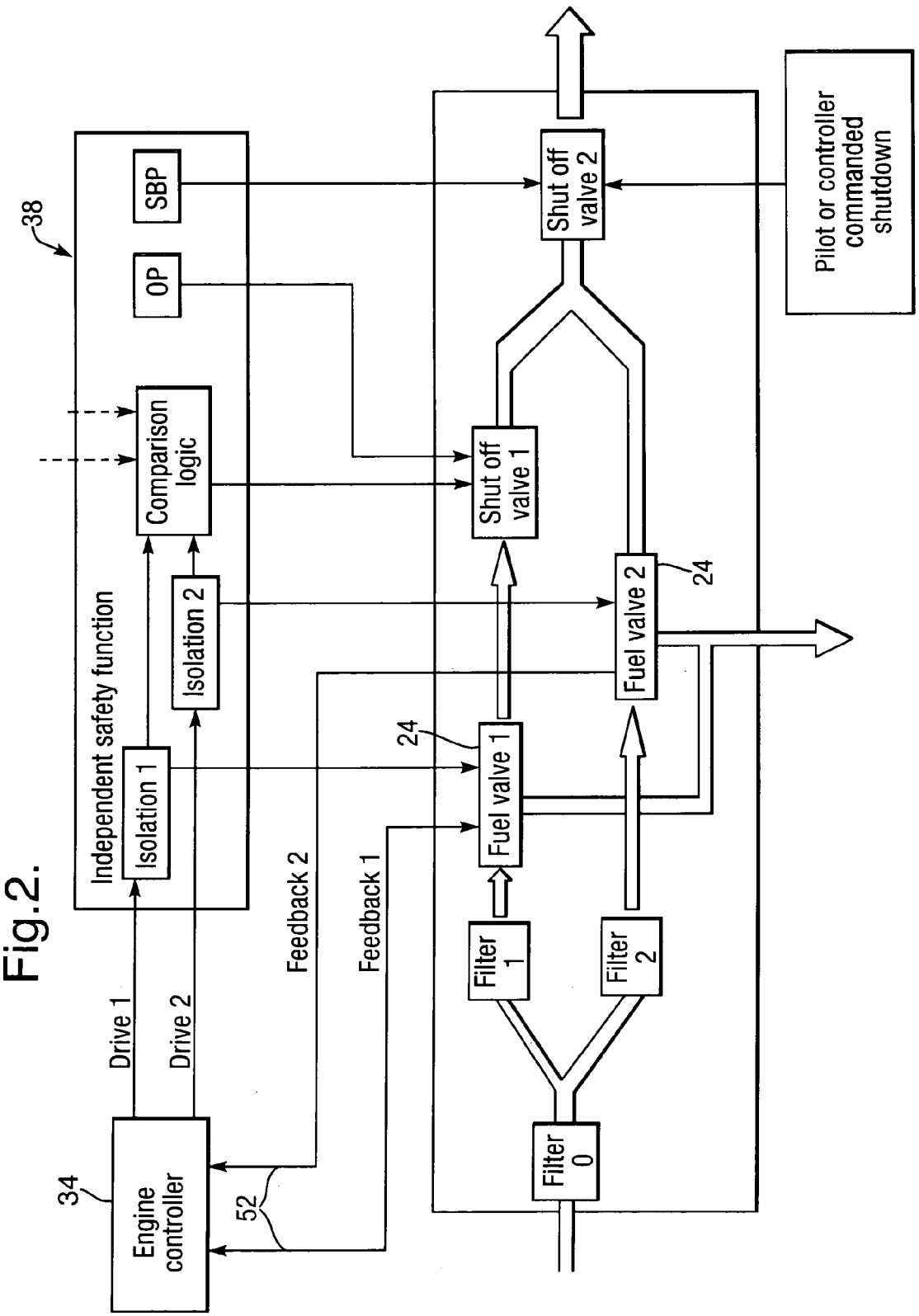
FIGS. 2 to 5 are similar views to FIG. 1, but for respectively second, third, fourth and fifth fuel metering units according to the invention.

The arrangements shown in FIGS. 2-5 show generally similar arrangements, and only the differences relative to the arrangements of FIG. 1 will be described. In FIG. 2 the flow measurements of the fuel made by the valves 24 are fed back to the engine controller 34, and appropriate drive signals are then sent by the engine controller 34 through the independent safety function 38 which checks these signals. It is generally easier for the less complex function 38 to check the drive signals rather than the flow measurement of the valves 24. The feedbacks 52 from the valves 24 to the engine controller 34 could measure the valve positions, or potentially could measure the pressure drop across the valves 24 or the actual fuel flow.

Figure 3:
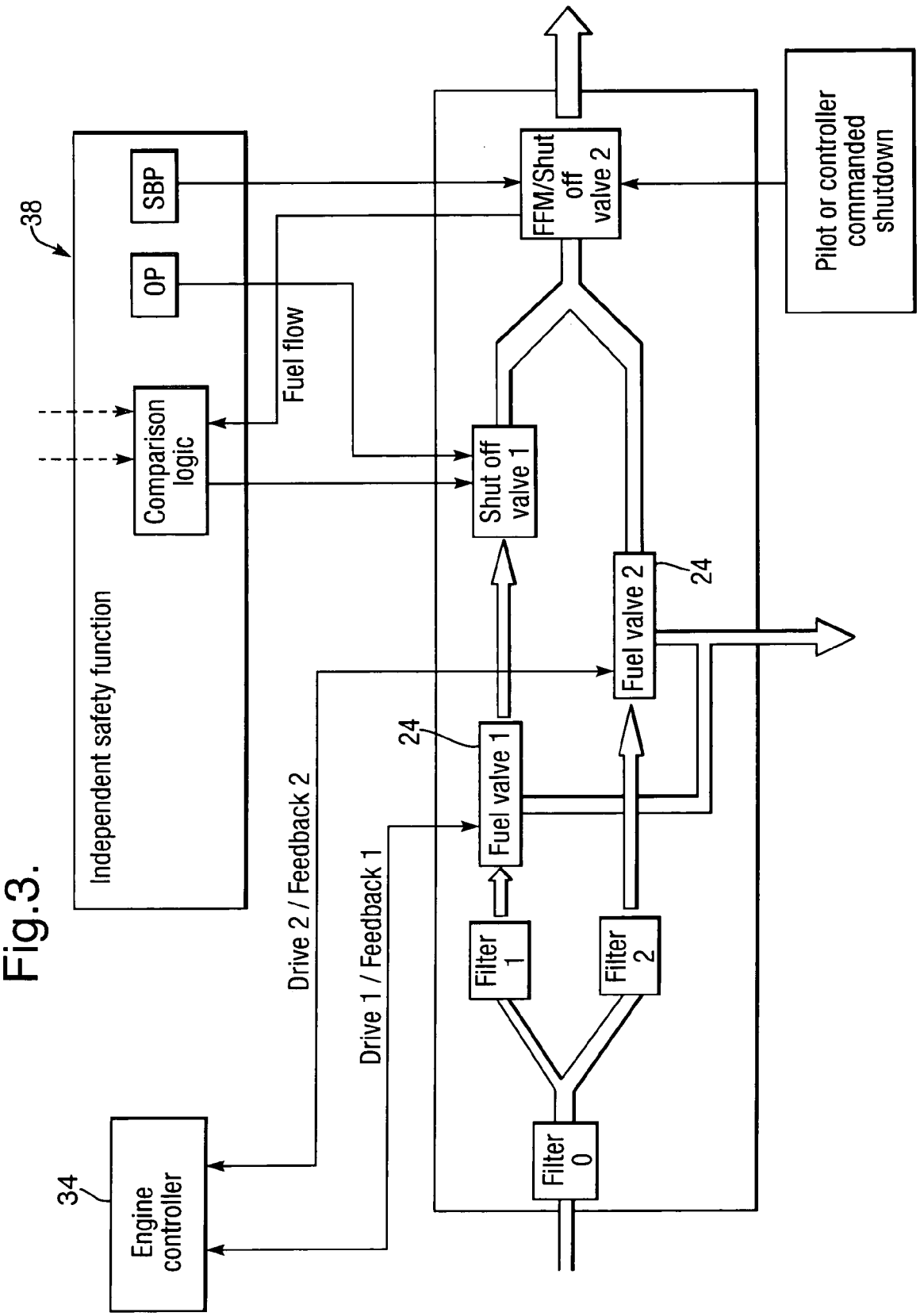

In FIG. 3 the measurements and drives for the fuel valves 24 do not pass through the independent safety function 38, but are dealt with entirely by the engine controller 34. An additional fuel flow meter (FFM) device is provided in the outlet leg, which may be integral with the shut off valve. The independent safety function 38 measures the fuel flow to see whether this is within expected limits bearing in mind the throttle position and aircraft discretes. In this arrangement the engine controller 34 can still generate predictive failure messages to enable further maintenance to be directed.

Figure 4:
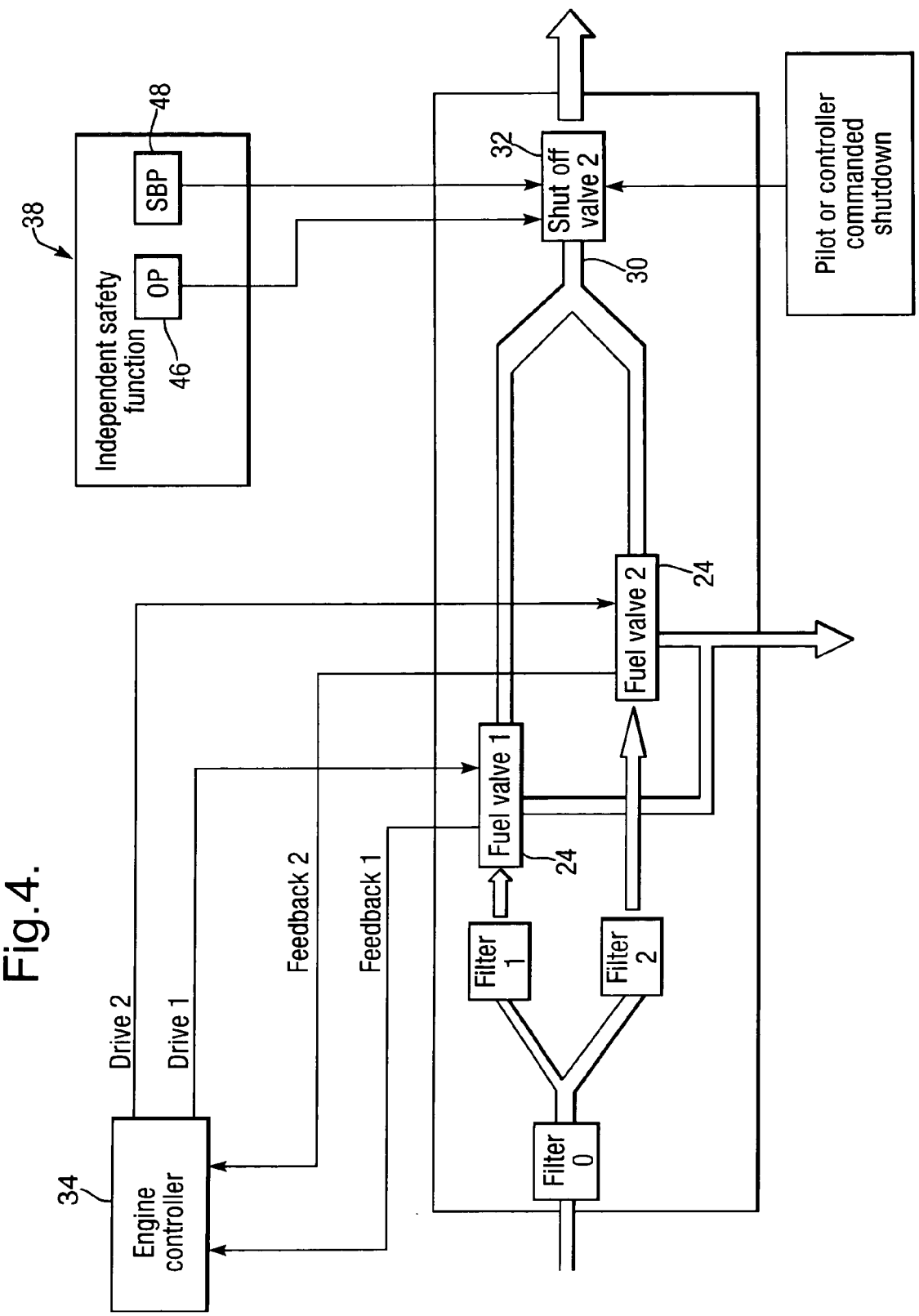

In the arrangement of FIG. 4, just one shut off valve 32 is provided in the outlet leg 30. In this arrangement the engine controller 34 measures the fuel flow and controls the valves 24, and any operation of the shut off valve 32 in relation to unexpected relative flows will be directed by the controller 34. The independent safety function 38 only incorporates overspeed protection 46 and shaft break protection 48. The independent safety function 38 can override the controller 34, and the controller 34 will still provide maintenance messages.

Figure 5:
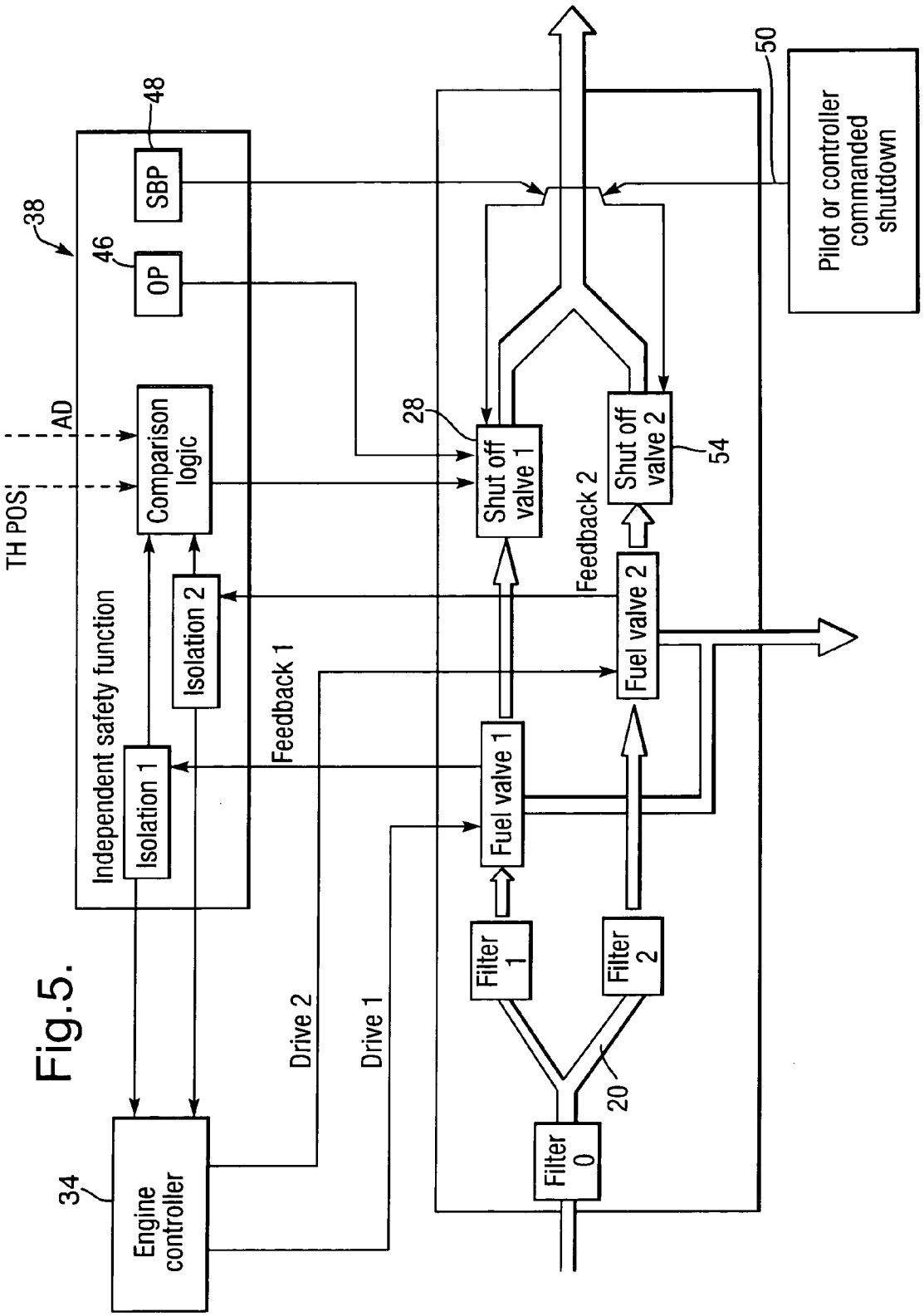

The arrangement in FIG. 5 incorporates a shut off valve 54 in the second leg 20. In general this arrangement will operate similarly to the unit 10 of FIG. 1, except that a choice can be made as to which of the shut off valves 28, 54 is operated presuming they are both not to be closed, in the event of a fault occurring. The overspeed protection 46 and the comparison logic 40 connect just to the shut off valve 28 but the shaft break protection 48 connects to both of the shut off valves 28, 54, as do shut down controls 50 from the pilot or engine controller 34.

Figure 6:
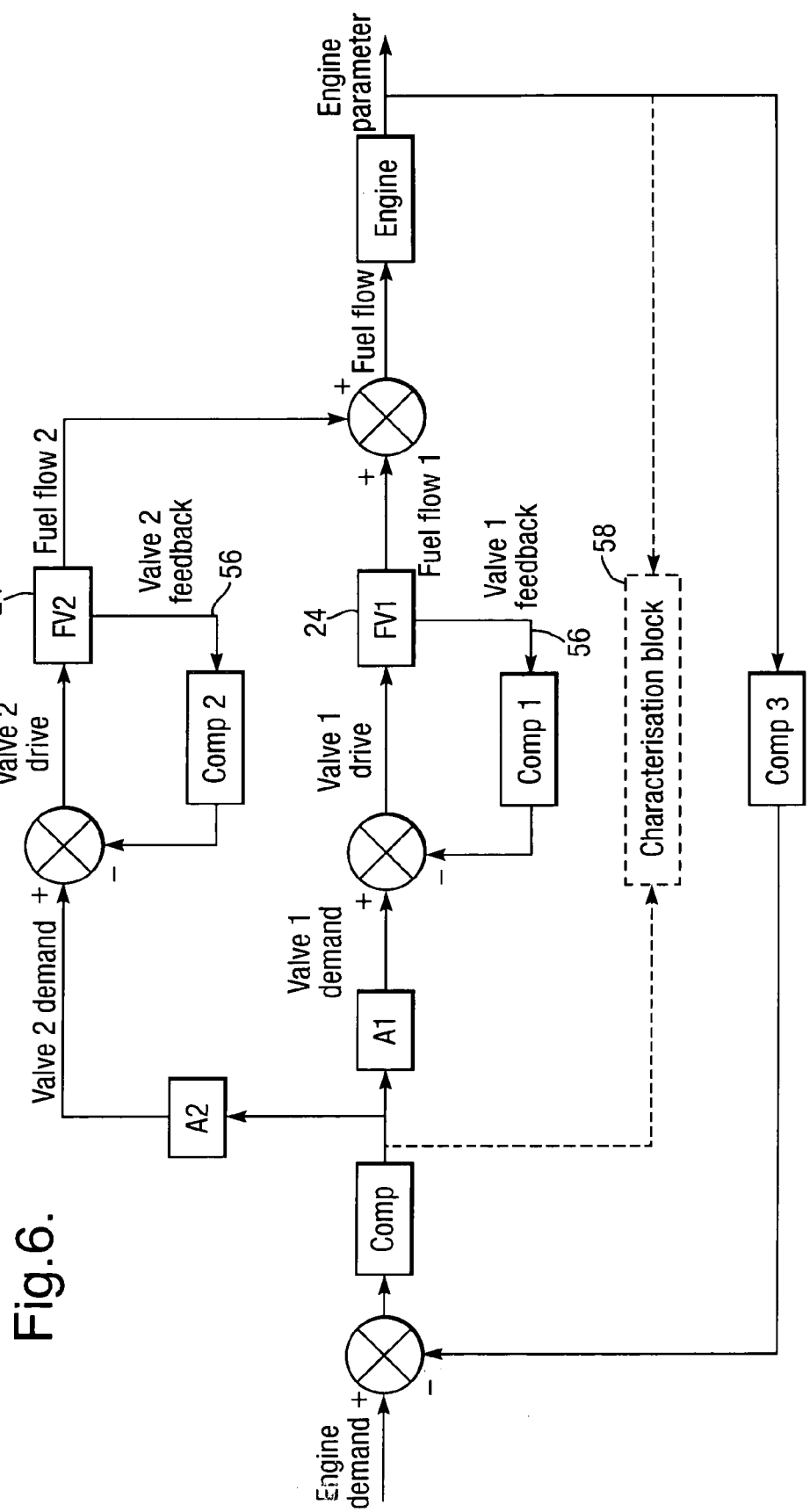
FIG. 6 is a block diagram illustrating how the first unit could be controlled.

FIG. 6 illustrates how the engine controller 34 could control the fuel valves 24. Each valve 24 is controlled by a position feedback loop 56 using suitable control algorithms. This design allows for a number of control and detection schemes to be incorporated, including the following:

A characterisation block 58 can be used to detect changes in the transfer function across the fuel system and engine. Closure of the first shut off valve 28 should be evident in which case it may be necessary to adjust the controller parameters on the remaining leg.

Blocks A1 and A2 could be intentionally modified by built in test equipment to test for anomalous behaviour in either fuel flow path. (For example, a large proportion of the fuel flow could be directed through one leg, and then the proportions could be switched over, but the total fuel flow should remain as expected.)

The valves 24 could be set up with opposite senses to achieve some dissimilarity in the control paths (for example positive current could open one valve and close the other). This could sometimes be an advantage in managing failure strategies.

The valves 24 could have different transfer functions and the control laws could be different in each leg, to give a degree of dissimilarity.

If the transfer functions of the legs are different, the characterisation block 58 may be able to deduce which leg is exhibiting anomalous behaviour.

There are thus described various fuel metering units and ways of controlling a jet engine which provide for significant advantages. The use of the two legs permits for a ready comparison of fuel flow thereby indicating gradual faults to enable maintenance messages to be set up, and more drastic faults to enable a partial or full shut down to take place as required. The facility of the partial shut down at least permits a reduced maximum thrust thereby reducing the potential effects of a failure, and in some of the above examples permits control albeit with a reduced maximum thrust. The independent safety function means that faults in the complex engine controller can be handled which may be due to software problems or an actual fault developing. Faults such as one or more of the filters becoming blocked or the valves failing, can readily be handled by these systems.

It is to be realised that a wide range of modifications other than those outlined above can be made without departing from the scope of the present invention. For instance, any of the above described features can be combined as required. Whilst in general it has been suggested above that the two controlling legs are of equal size, it could be arranged so that a greater flow occurs through one than the other. As noted above, using the two legs could be advantageous in providing particularly accurate flow control in one leg for use in light up conditions.

Whilst the above described examples have related entirely to a jet engine for aircraft, it is to be realised that fuel metering units such as this could be used in a wide range of different applications with different vehicles or elsewhere.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of controlling a jet engine, the method comprising:
    dividing a fuel flowing to a jet engine into first and second controlling legs, the first controlling leg being provided with a shut-off valve therein and the second controlling leg not being provided with a shut-off valve therein, measuring a relative amount of fuel flow in each leg; and acting upon a detection of an unexpected result of a comparison between the fuel flows in the first and second controlling legs by closing the fuel shut-off valve in the first controlling leg and controlling the fuel flow through the second controlling leg to a restricted maximum to provide a reduced maximum thrust from the jet engine.

2. A method according to claim 1, wherein the acting upon step further comprises at least one of logging a maintenance signal to identify the requirements of subsequent inspection/maintenance, and providing an alarm signal to a person controlling the jet engine.

* * * * *